United States Patent [19]

Braun

[11] Patent Number: 4,986,575
[45] Date of Patent: Jan. 22, 1991

[54] PLASTIC PROTECTIVE TUBE ARRANGEMENT FOR LINES

[75] Inventor: Franz-Josef Braun, Königsberg/Bayern, Fed. Rep. of Germany

[73] Assignee: Frankische Rohrwerk Gebr. Kirchner GmbH & Co., Konigsberg, Fed. Rep. of Germany

[21] Appl. No.: 123,450

[22] Filed: Nov. 17, 1987

[30] Foreign Application Priority Data

Nov. 25, 1986 [DE] Fed. Rep. of Germany ....... 3640226

[51] Int. Cl.$^5$ .............................................. F16L 37/26
[52] U.S. Cl. .................... 285/325; 285/156; 285/419; 285/903
[58] Field of Search ............... 285/373, 419, 121, 325, 285/903, 156; 138/122, 121, 128, 173, 92, 151, 156; 174/68 C; 405/154, 156, 157, 150; 251/145

[56] References Cited

U.S. PATENT DOCUMENTS

| | | | |
|---|---|---|---|
| 1,360,160 | 11/1920 | Weaver & Fleck | 251/145 |
| 3,071,193 | 1/1963 | Raulins | 251/145 |
| 3,076,737 | 2/1963 | Roberts | 138/121 X |
| 3,336,950 | 8/1967 | Fochler | 138/121 |
| 3,669,473 | 6/1972 | Martin et al. | 285/903 X |
| 3,699,684 | 10/1972 | Sixt | 285/373 X |
| 3,711,633 | 1/1973 | Ghirardi et al. | 285/156 X |
| 3,892,912 | 7/1975 | Hauck | 174/68 C |

FOREIGN PATENT DOCUMENTS

| | | |
|---|---|---|
| 2304852 | 8/1974 | Fed. Rep. of Germany . |
| 3405552 | 8/1985 | Fed. Rep. of Germany . |
| 679044 | 4/1930 | France . |
| 7527406 | 1/1977 | France . |
| 2355387 | 1/1978 | France . |
| 2489613 | 3/1982 | France . |
| 8018646 | 5/1982 | France . |
| 714852 | 9/1954 | United Kingdom ........... 138/121 X |

Primary Examiner—Dave W. Arola
Attorney, Agent, or Firm—Armstrong, Nikaido, Marmelstein, Kubovcik & Murray

[57] ABSTRACT

In an annularly corrugated flexible plastic protective tube or conduit for receiving lines the longitudinal slit thereof is so widened that it is readily possible to insert the lines without interference. Clamped in fitting manner on the tube is an outer tube which also has a wide longitudinal slot and which covers the longitudinal slot of the first tube. The locking engagement of inner and outer tubes can be improved by corresponding complementary formation of the ribs or corrugations of the tubes. Branch pieces can be clamped onto the inner and outer tubes.

9 Claims, 4 Drawing Sheets

PLASTIC PROTECTIVE TUBE ARRANGEMENT FOR LINES

BACKGROUND OF THE INVENTION

1. Field of the Invention

The invention relates to a plastic protective tube or conduit arrangement for lines, preferably for cable harnesses in motor vehicles, comprising an annularly corrugated flexible plastic tube for receiving the lines, said tube having a longitudinal slit or slot for inserting the lines.

2. Description of the Prior Art

Such an arrangement is known from German OS No. 3,405,552 and comprises a corrugated flexible plastic tube which is longitudinally slit. In the region of the longitudinal slit the tube walls overlap each other and can be fastened together in press-stud manner by complementary interlockable means A cable harness or tree can be inserted into such a tube through the bent-open longitudinal slit; hereafter the longitudinal slit is closed and the cable harness is protected by the tube from mechanical and chemical influences.

However, on laying round tight curves when the closed longitudinal slot is in an unfavourable position it can spring open again; it is also possible for the cable tree or harness to be damaged on the sharp longitudinal edges when introduced through the narrow longitudinal slit.

In addition, the wall thickness of such a plastic tube is relatively small due to the production methods; it may therefore happen that the known plastic tube is crushed by projecting edges or the like.

The disadvantage mentioned at the beginning can admittedly be overcome by longitudinal division of the tube into two half tubes as is known from German OS No. 2,304,852 but this latter known arrangement has the disadvantage that the cable harness or tree after insertion into one of the tube halves does not stay in the latter but must be additionally fixed before the other tube half is fitted.

If several tube portions are to be attached to a cable tree or harness and lie one behind the other a special connecting sleeve is necessary to avoid the cable being worn through by the tubes at the joint between said two tubes.

An advantage of the known conduit arrangement resides in that it has a substantially circular outer contour so that commercially available connecting fittings, connecting sleeves and the like can be employed.

A further advantage of the known arrangement is that projecting nipples which can be cut open are provided on the tube and branches of the cable tree or harness can be inserted into said nipples and thus need not be passed through the longitudinal slit. These branch positions must however be sealed with insulating tape or the like to prevent water or other liquids from reaching the interior of the conduit or tube arrangement.

SUMMARY OF THE INVENTION

The invention therefore has as its object the further development of the known tube or conduit arrangement referred to at the beginning in such a manner that insertion of the cable harness is facilitated, jamming of the cable harness in the slit of the tube is no longer possible, the constant sealing of the tube or conduit is ensured even at sharp bends and longitudinal portions can be assembled together without additional connecting sleeves. Furthermore, conduit branches are to be possible at any point, i.e. including locations where corresponding means are not already previously provided. Finally, the strength of the tube arrangement and its resistance to squashing, buckling, etc., is increased without increasing the actual wall thickness.

Another object of the invention is to provide a kit for the plastic protective conduit arrangement of a motor vehicle which is not only adapted to an existing cable tree or harness but in addition can be adapted to a great variety of additional lines.

The invention therefore proposes in a plastic protective tube arrangement for lines and preferably for cable harnesses in motor vehicles comprising an annular corrugated flexible plastic tube for receiving the lines, said tube having a longitudinal slot for insertion of the lines, the improvement that a second annular corrugated longitudinally slit outer plastic tube is provided which is fitted onto the inner plastic tube from the outside and covers the longitudinal slot thereof. The invention also proposes a kit of longitudinal sections, cut to size, of at least one inner and outer tube and possibly at least one branch piece.

According to the invention, a single plastic tube or conduit is not used, as hitherto generally usual, but two concentric plastic tubes which partially surround each other The tube arrangement according to the invention thus has over the greater part of its circumference a double wall without the actual wall thickness of each of the plastic tubes being increased.

The interior of said two plastic tubes comprises a relatively wide slot or slit, the longitudinal edges of which certainly do not contact each other, let alone overlap. The insertion of even a thick cable harness or tree or of hydraulic or compressed air lines, vacuum tubes and the like, into said inner tube is readily possible without any danger of said lines being damaged on insertion.

The slit width can be so dimensioned that the lines once placed in the inner tube stay of their own accord in the inner tube during assembly so that it is not necessary to additionally fix said lines during assembly. The slot width of the inner tube is fundamentally so dimensioned without the slot having to be bent apart at all or to any appreciable extent. The securing of the lines in the inner tube is nevertheless sufficient.

An outer tube which in turn has a longitudinal slot or slit is clamped over the inner tube.

Said outer tube covers the slot in the inner tube, the inner surface of the protective tube arrangement thus formed not having any projection extending inwardly to such an extent that it could form a rubbing point.

The inner and outer tubes can be delivered by the meter and cut to the desired lengths or alternatively supplied as shorter sections which can be assembled to greater lengths: if two inner tubes adjoin each other lengthwise it suffices to clamp over the joint a continuous portion of an outer tube in order to provide a connection between the two inner tubes which withstands high stresses. The same applies to two abutting longitudinal portions of outer tubes which can be clamped onto a continuous inner tube.

Whereas in production vehicles the protective tube or conduit arrangements for the cable harnesses and the like are supplied as a rule as prefabricated kits, the protective tube arrangements for special vehicles, for example truck bodies, omnibuses, community vehicles and the like, must be cut to size. It is particularly advantageous in such cases that additional portions can be easily added to the protective tube arrangement according to the invention.

The provision of branches, in which one or more wires are "branched off" from the main cable harness, is also easily possible in that between the two adjacent ends of two outer tubes a space is left which corresponds preferably to an integer multiple of the corrugation pitch. In this manner a passage opening is provided through which the branch of the cable harness can pass. In the assembly the cable harness is simply inserted into the inner tube, the branches projecting outwardly through the longitudinal slot thereof. Thereafter appropriately cut lengths of the outer tube are clamped onto the inner tube. The position of a branch is not restricted to certain prefabricated formations. The branch point need only be sealed with insulating tape or the like as conventionally done.

It is also possible to form at a branch point in the inner and/or outer tube a cutout, in which portions of the tube material are removed, preferably starting from an edge of the respective slot.

This cutout can extend in the inner or outer tube in each case up to the region opposite the slot in the inner or outer tube. It is also possible to arrange on the inner and outer tube opposite each other a cutout which then need only extend to such an extent that the two overlapping cutouts leave enough space for passage of the branch.

When the protective conduit arrangement is provided as a finished kit for a production vehicle and at a point not provided in the kit because of a specific automobile accessory a branch line is to be introduced, it is also easily possible to attach a branch by separating the associated outer tube into two individual sections and removing a short portion or punching, cutting out or otherwise removing the aforementioned cutout in the outer and/or inner tube. This does not require a special tool or particular skill.

The ribs or corrugations of the outer and inner tubes have fundamentally to improve the flexibility of the tube arrangement and can be dispensed with where this flexibility is not necessary and the tube arrangement is laid only rectilinearly. It is fundamentally possible to provide the outer and inner tubes with the same or different corrugation.

According to a preferred embodiment of the invention however it is particularly of advantage for the ribs of the inner tube to lie in the corrugations of the outer tube; the inner and outer tubes thus have the same pitch as regards their ribs or corrugations but the width of the ribs of the inner tube is less than that of the outer tube so that said tubes can be clamped together in complementary manner. The particular advantage of this configuration is not only that a particularly good sealing is obtained but also that the outer and inner tubes cannot shift with respect to each other in the longitudinal direction as would otherwise be fundamentally possible during assembly of the protective tube arrangement at curves and bends. There is thus also no danger that when branch lines are led out through cutouts they can be crushed or clamped by the longitudinal shifting of the outer and inner tubes.

According to a further preferred embodiment of the invention the ribs of the inner tube and the corrugations (inner side of the ribs) of the outer tube are made to match each other so that they can be clamped together. The outer tube, which stays on the inner tube simply because the width of its slot is less than its diameter, is thus additionally clamped with its corrugations on the ribs of the inner tube so that a particularly firm connection is achieved which does not come apart even when the protective tube arrangement is laid round bends or curves. On the other hand this protective tube arrangement can be opened at any time to make checks, carry out repairs or insert additional lines in that the two slit edges of the outer tube are bent apart and the outer tube then simply pulled off the inner tube. Thus, a sealed protective tube arrangement is obtained but the interior thereof is always accessible without having to remove and then reattach an outer additional seal which can be formed for instance by an insulating tape wrapping as necessary with the known longitudinal slit protective tube arrangements referred to at the beginning for better sealing and holding together.

A further advantage of the complementary form of the ribs of the inner tube and the corrugations of the outer tube is that in the interior of the protective arrangement there is only a very narrow projecting edge which corresponds substantially to the wall thickness of the inner tube and is thus unable to lead to any damage of the lines introduced by rubbing.

According to a further preferred embodiment of the invention an antiturn means is disposed between the inner and outer tube to prevent rotational movement of the outer tube with respect to the inner tube, for example in the form of projecting nipples on one of the tubes and cutouts on the other; thus, the already closed protective tube arrangement with inserted cable harness can be twisted during the installation without this leading to opening of the slot at any point.

Particularly advantageous as an antiturn means for example is a strip-like projection formed on the outer tube and engaging into the slot of the inner tube because by an appropriate height thereof a completely smooth inner wall of the arrangement can be obtained.

According to a preferred embodiment of the invention however on the inner tube a longitudinal strip is formed the width of which is preferably less than the width of the slot of the outer tube in the assembled state or is equal thereto so that the inner tube engages the edges of the longitudinal slot of the outer tube in a manner preventing turning and at the same time the protective tube arrangement preferably forms a flush smooth continuous outer contour. The particular advantage of this arrangement is that such a protective tube assembly can be sealingly connected to commercially available connecting pieces, sleeves and the like because these means are fundamentally designed for circular tube outer cross-sections.

Fundamentally, the slot in the inner tube can have the same width as the slot in the outer tube. According to a preferred embodiment of the invention however the slot in the outer tube is wider than the slot in the inner tube to such an extent that on hurried clamping together of outer and inner tubes it is ensured that the outer tube never enters the slot of the inner tube. This reliably prevents assembly disturbances and possibly resulting damage to the lines inserted in the inner tube.

It has been found particularly advantageous for the width of the slot of the inner tube to be about one-fourth to one-half the diameter thereof; this provides a slot width which permits easy damage-free insertion of lines with at the most only slight bending apart of the slot edges whilst on the other hand the two slot edges in the unloaded state engage behind the cross-section of the inner tube to such an extent that the lines inserted into the inner tube are prevented from coming out of the slot again during assembly without having to provide any additional holding means.

It suffices for the width of the longitudinal slit in the outer tube to be at the most a few millimeters wider than the width of the slit in the inner tube. In this manner the outer tube engages with the edges of its slot round the inner tube to such an extent that a reliable clamping fit is ensured even at narrow bends of the protective tube arrangement due to this configuration alone.

As described above in the protective tube arrangement according to the invention it is readily possible to form at any desired point openings for line branches. These openings must however be sealed in the usual manner.

According to a further preferred embodiment of the invention special branch pieces are provided which are formed for instance in the manner of a T member of a continuous tube piece and a branch piece branching therefrom. The invention relates expressly also to such a branch piece. Said branch piece is longitudinally split according to the invention into two half shells and the tube piece made up of two halves, preferably also the branch tube piece, are so shaped that they engage round the inner and outer tube. Preferably, however, on the tube piece, and possibly also on the branch piece, ribs or corrugations adapted to the inner and outer tube are formed. It is thus possible to clamp the two half shells on the inner and outer tubes, the branch piece in turn being clampable if required onto a branch inner and outer tube.

With the aid of the branch members it is possible to cover even a branched cable harness without any gaps between the tubes and the branch pieces with the protective tube arrangement. The main skein of the cable harness is inserted through the longitudinal slot described into the inner tube which is for example continuous. The branch line is led out through the slot of the inner tube. Sections of the outer tube are clamped at a spacing corresponding to the thickness of the cable branch on both sides of said branch onto the inner tube. The slots of the outer tube sections are on the opposite side from which the slot of the inner tube is located. The half shells of the branch member are arranged on the protective tube arrangement such that the branch tube piece comes to lie over the slot of the inner tube and receives the cable harness branch; they thus engage round the inner and outer tubes and the cable branch. In the branch tube piece for protecting the branch lines a similar arrangement of inner and outer tubes may also be provided as described for the main skein of the cable harness.

If a branch is to extend in another radial direction of said inner tube it is however also possible to separate the protective tube arrangement and arrange the two tube ends spaced apart from each other a distance adequate for passage of the branch line. In this position the tube piece is clamped onto the two facing ends of the protective tube arrangement, the branch tube piece pointing in the direction in which the branch line is to extend.

It is however also possible to provide the aforementioned cutouts on the inner and/or outer tubes and then align the branch tube piece accordingly.

It is fundamentally also possible to form the tube piece and/or branch piece complementary to the ribs of the inner and outer tubes so that the tube piece or branch tube piece can be clamped onto the inner and outer tubes.

Preferably, the branch members engage from the outside round the entire protective tube arrangement and to achieve a form-locking connection in the interior of the tube and/or branch pieces means are formed which engage in the corrugation troughs of the protective tube arrangement. This concerns in particular the outer tube; the inner tube possibly engages the connecting piece only in the region of the slot of the outer tube.

To hold the two half shells reliably together a tube or conduit clip could be placed round part of the branch member. According to a preferred embodiment of the invention however it is of particular advantage for the two parts of the tube piece to be connected together by an integrally formed film hinge which when the branch member is attached at a branch point ensures that the two halves of the tube piece are connected together at one side. It is then only necessary to provide a securing means at another point of the branch member, preferably at the branch tube piece. According to a preferred embodiment of the invention the securing means is provided in the form of detent means so that without any tool or additional holding means the branch member can be placed at the branch point round the protective conduit arrangement containing the main skein and held by detent engagement. The detent is preferably so formed that it can be readily opened again so that in a subsequent operation the protective tube arrangement can be opened and a further branch line led out.

According to further preferred embodiments of the invention on the branch member on the one hand and on the protective tube arrangements of the main line skein and/or the branch skein on the other hand, antiturn means are provided which are effective towards the respective outer and/or inner tube. If the tube piece can be clamped onto the inner and outer tube it can preferably comprise an inner longitudinal groove which is adapted to be brought into engagement with the longitudinal web of the inner and outer tube and receives the longitudinal web of the inner tube. It is possible to provide connecting pieces with different angular position of the longitudinal groove for cases in which the branch line is to branch off in a different corresponding radial direction from the main direction.

It is however also possible with a substantially circular outer contour of the protective tube arrangement to omit the antiturn means.

It is thus possible with individual parts of the protective tube arrangement according to the invention not only to provide prefabricated protective conduits for specific motor vehicle types but also to provide protective tube conduits in kit-like manner possibly with complicated branch points and abrupt bends, the branch points not being restricted to the points at which corresponding means have previously been formed. On the other hand, it is possible for example with the protective tube arrangement for a motor vehicle to divide the outer tube from the start at points at which a branch is to be provided for special accessories and to provide a short inserted outer tube portion, the length of which is however smaller than the length of the branch member so that on installation of the accessory belonging to the branch it is only necessary to remove from the correct position said short outer tube portion and fit the branch member.

Thus, altogether it is possible to provide a protective tube conduit kit for a production vehicle comprising a conduit adapted to installion in a vehicle with standard equipment. In this protective tube conduit detachable outer tube portions are provided between all possible branch points; furthermore, the kit also contains all the branch members and possibly protective tube arrangements for branch lines corresponding to all extras available for the vehicle.

A kit may however fundamentally in module manner comprise a collection of precut lengths with outer and inner tubes and branch members thus making it possible when wiring special vehicles, for example cranes and the like, to put together the associated protective tube arrangements.

The invention also relates to a kit of the type described.

BRIEF DESCRIPTION OF THE DRAWINGS

The invention is described in more detail hereinafter with reference to examples of embodiment with the aid of the schematic drawings, wherein.

DESCRIPTION OF THE PREFERRED EMBODIMENTS

Figure 1:
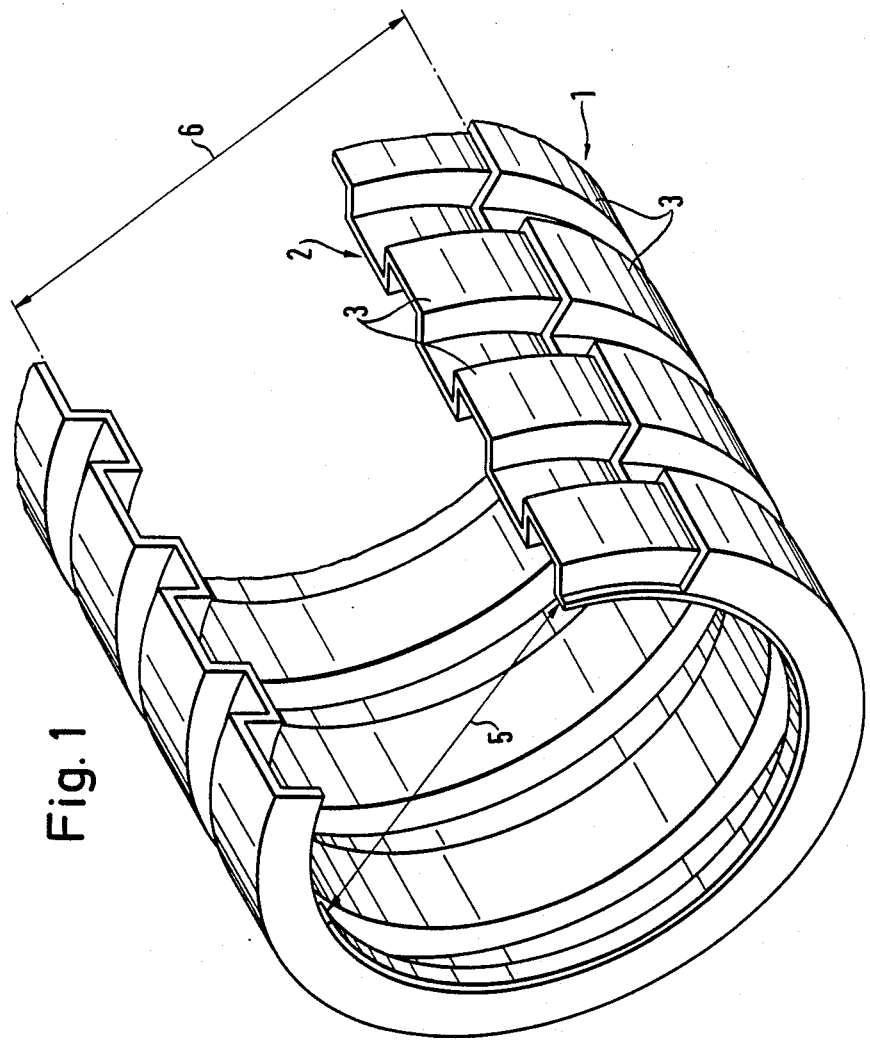
FIG. 1 is a schematic perspective view of the protective tube arrangement according to the invention.

FIG. 1 is a perspective view of a protective tube arrangement comprising an outer tube or conduit 1 of plastic. The wall material of said outer tube 1 is shaped to annular corrugations or ring-like webs 3 so that the corrugated tube is stiff as regards compression but can easily be bent. The webs 3 or corrugations can fundamentally also extend spirally.

Arranged in the interior of the outer tube 1 is an inner tube 2 whose wall thickness corresponds substantially to that of the outer tube 1 and whose wall material is also shaped to annular ribs and corrugations whose pitch is equal to that of the outer tube. As can be seen the ribs 3 of the inner tube 2 are so formed that they fit exactly in a corrugation of the outer tube 1.

The outer tube 1 comprises a longitudinal slot or slit 6 whilst the inner tube 2 has a slot 5. In the assembled state the two slots 5, 6 lie at longitudinal sides of the protective tube arrangement which face away from each other.

The material of the inner tube 2 is sufficiently flexible so that before clamping the outer tube 1 the edges of the longitudinal slot 5 can easily be bent apart should this be necessary for insertion of lines, for example a cable harness; the slot is in itself wide enough from the start to permit insertion of said lines. The slot 6 of the outer tube 1 is appreciably wider than the slot 5 of the inner tube 2; the outer tube 1 is sufficiently flexible so that the longitudinal slot 6 can be bent far enough apart to enable the outer tube 1 to be clamped onto the inner tube 2. Because of the different width of the slots 5, 6 it is not possible for the outer tube 1, for instance in the clamping together, to bend up the slot 5 of the inner tube 2 and penetrate the latter.

Figure 2:
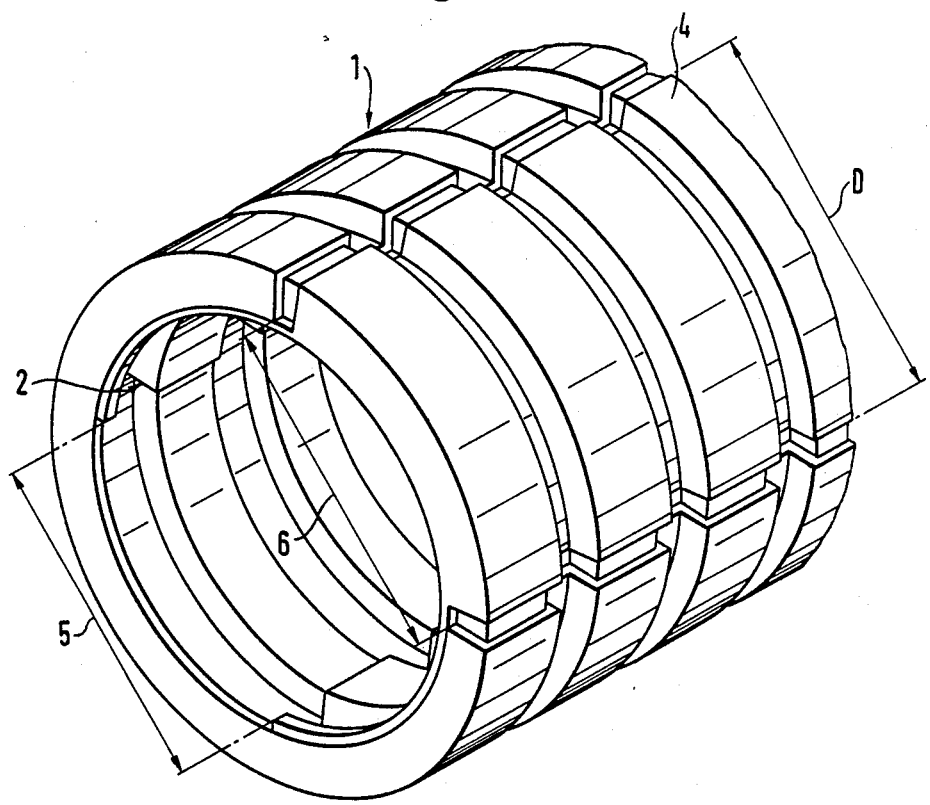
FIG. 2 is a perspective view of another embodiment of a protective tube arrangement according to the invention to an enlarged scale.
Figure 3:
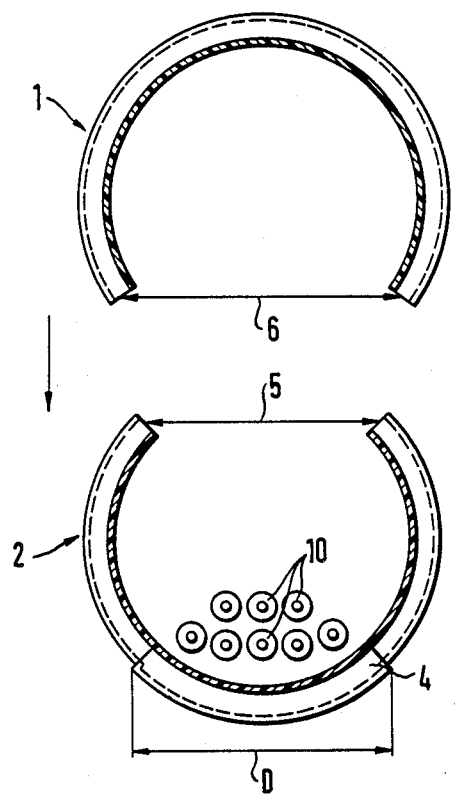
FIG. 3 is a cross-section of outer and inner tubes when these parts are clamped together for the embodiment of FIG. 2

FIGS. 2 and 3 show another embodiment of the protective tube arrangement; in this case corresponding elements are denoted by the same reference numerals and will not be described in detail below.

The inner tube 2 of this embodiment comprises on the portion of its outer side remote from the longitudinal slot 5 a longitudinal strip 4 whose height corresponds substantially to the wall thickness of the wall material of the outer tube 1 and whose breadth D is less than that of the longitudinal slot 6 in the outer tube 1 or is equal thereto.

During assembly, firstly the cable harness formed from the lines 10 is inserted into the inner tube 2 and then the inner tube 2 and outer tube 1 are pressed together in the direction of the arrow (FIG. 3). The different width of the slots 5, 6 ensures a troublefree clamping operation.

After the clamping the longitudinal edges of the slot 6 in the outer tube 1 lie flush against the longitudinal edges of the longitudinal strip 4 of the inner tube 2 so that altogether a tube arrangement results having a substantially continuous outer contour as shown in FIG. 2.

Figure 4:
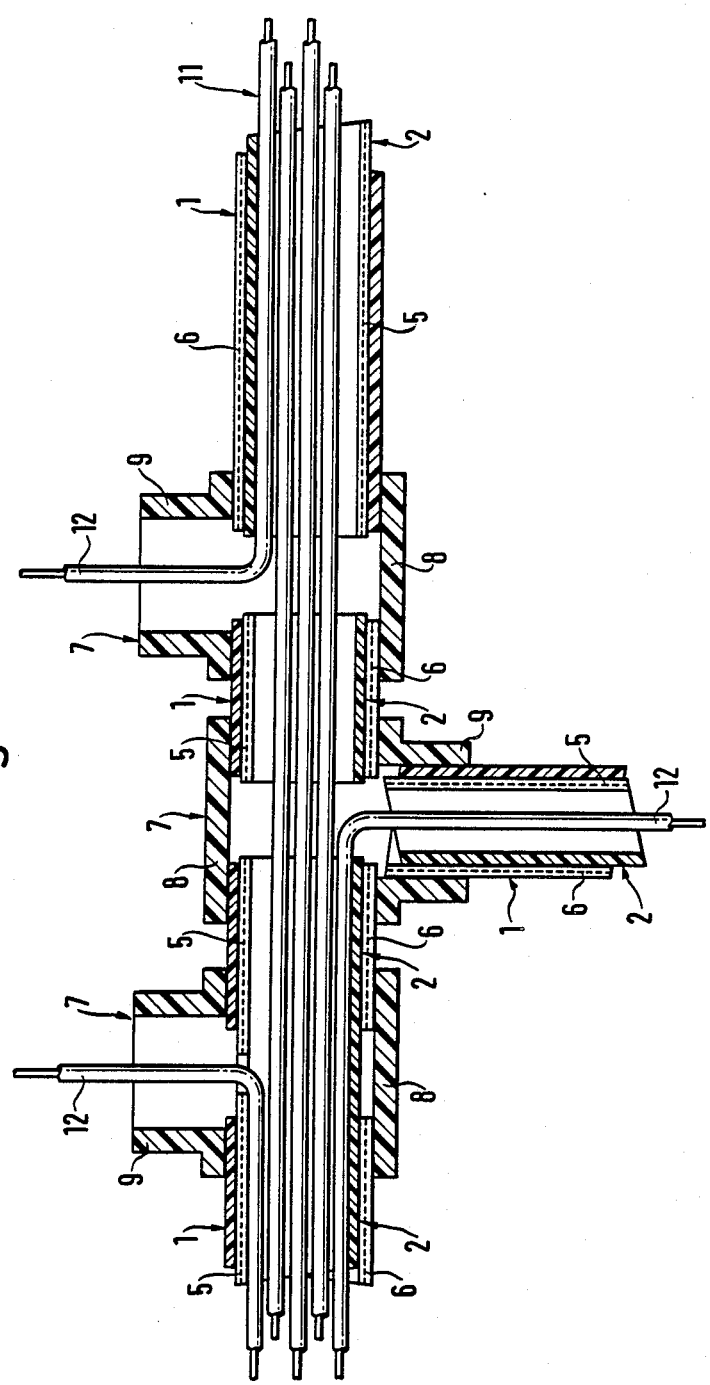
FIG. 4 is a longitudinal section through an arrangement comprising branch members according to the invention.

FIG. 4 shows a cable harness or tree inserted into a protective conduit arrangement 1, 2 and from said harness three branch lines 12 branch off.

The outer tube 1 and the inner tube 2 are shown only schematically; a series of dots denotes in each case the slot 6 of the outer tube 1 and the slot 5 of the inner tube 2.

At the left of the three branches shown, the inner tube 2 extends without interruption with upwardly directed slot 5. The branch line 12 is led in the drawing upwardly through the slot 5 out of the interior of the inner tube 2.

The outer tube 1, the slot 6 of which points downwardly, extends only up to the branch; beyond the latter a new outer tube 1 is clamped onto the inner tube 2.

A branch member 7, constructed as a T piece, has a tube piece 8 which is clamped onto the ends of the two outer tubes 1 and bridges the gap between them. The branch member 7 further comprises a branch tube piece 9 which branches from the tube piece 8 at a right-angle thereto and through which the branch line 12 is led.

The spacing between the adjacent ends of the two outer tubes 1 is so dimensioned that the two ends of the tube piece 8 are in engagement over an adequate length with the tube ends of the outer tube 1 to ensure a reliable holding of the arrangement.

The branch member 7 is illustrated in the drawings for simplicity as a single part; in fact, however, the branch member 7 is longitudinally split in the centre so that it can be bent over the ends of the outer tubes 1; the two split parts of the branch member 7 are then locked together.

The second centre branch point comprises a branch line 12 which branches off the cable harness 11 in a direction which is opposite to the position of the slot 5 of the inner tube 2. For this reason the inner tube 2 is divided at this point. The outer tube 1 could extend continuously at this point because the branch line 12 is led through the slot 6 of the outer tube 1. However, it is equally possible to divide the outer tube 1 as well, as shown in the drawings.

The branch member 7 is clamped onto the two ends of the adjacent outer tubes 1 as already shown for the first left branch point; however, in the drawing, the branch tube piece 9 points downwardly.

At this point the branch line 12 is to extend over a relatively long distance and for this reason is also placed within a protective tube arrangement which is formed from an inner tube 2 and an outer tube 1 which in turn is firmly secured in the branch tube piece 9 so that it cannot slip.

A branch point can also be used for changing the position or orientation of the slots 5, 6 as is particularly expedient for subsequent further branch points. Such an arrangement is shown at the third right branch point in FIG. 4. In this case the slot 5 of the left inner tube 2 points upwardly whilst the slot 5 of the right inner tube 2 points downwardly.

Although not apparent in the drawing because of the schematic illustration, the outer tube 1 and inner tube 2 are formed in the manner shown in FIGS. 1 and 2. The inner surface of the tube piece 8 and the branch tube piece 9 are provided with annular corrugations complementary to the configuration of the outer tube so that at the branch points a form-locking engagement takes place between the respective outer tubes 1 and the branch member 7.

As indicated in the drawings the wall thickness of the branch member 7 is relatively great so that said member is stiff enough to ensure a permanent reliable fit of the outer tubes 1 in the respective branch member 7.

I claim:

1. A plastic protective tube arrangement for lines and preferably for cable harnesses in motor vehicles comprising a first annular corrugated flexible plastic tube for receiving the lines, said tube having a longitudinal slot defined by longitudinal edges of said first tube for insertion of the lines, wherein a second annular corrugated slot plastic tube having a longitudinal slit therein defined by longitudinal edges of said second tube is provided which is reversibly fitted onto the inner plastic tube from the outside and covers the longitudinal slot thereof, and further wherein said arrangement includes antiturn means disposed on one of said inner and outer tubes for preventing relative rotational motion between said inner and outer tubes wherein said antiturn means includes a projection on one of said inner and outer tubes for engaging edge abutments on longitudinal edges of the other of said inner and outer tubes, said projection having substantially the height of said edge abutments on the other tube engageable therewith.

2. An arrangement according to claim 1, wherein ribs of the inner tube lie in the corrugations of the outer tube.

3. An arrangement according to claim 2, wherein the ribs of the inner tube are in cooperative engagement with the corrugations of the outer tube.

4. An arrangement according to claim 1, wherein the anti-turn means is formed as a longitudinal strip on the inner tube, the width (D) of which is no greater than the width of the longitudinal slot in the outer tube and which engages into the latter.

5. An arrangement according to claim 4, wherein the outer tube and the longitudinal strip form a flush continuous outer contour.

6. An arrangement according to claim 1, wherein the longitudinal slot in the outer tube is wider than the longitudinal slot in the inner tube.

7. An arrangement according to claim 1, comprising a branch member having a continuous corrugated longitudinally split tube piece which is adapted to be attached in fitting manner to one of said tubes and a longitudinally split branch tube piece, each half of which is respectively integrally formed on opposite sides of the split on a part of the tube piece, the two half shells thus formed being adapted to be placed around one of said and secured to each other.

8. An arrangement according to claim 7, wherein the branch tube piece is adapted to be placed in fitting manner about one of said tubes.

9. An arrangement of any one of claims 1–3, 4–7 and 11, further including a kit of longitudinal portions cut to size of at least one outer and inner tube.

* * * * *

UNITED STATES PATENT AND TRADEMARK OFFICE
CERTIFICATE OF CORRECTION

PATENT NO. : 4,986,575

DATED : January 22, 1991

INVENTOR(S) : BRAUN

Page 1 of 2

It is certified that error appears in the above-identified patent and that said Letters Patent is hereby corrected as shown below:

On the cover page, Item [73], "Frankische Rohrwerk Gebr. Kirchner GmbH & Co., Konigsberg, Fed. Rep. of Germany" should read --Fränkische Rohrwerke Gebr. Kirchner GmbH & Co., Königsberg, Federal Republic of Germany--.

Column 1, line 19, delete "means A" and insert --means. A--.

Column 2, line 28, delete "other The" and insert --other. The--.

Column 3, line 43, delete "have" and insert --serve--.

Column 8, line 16, delete "the, inner tube" and insert --the inner tube--.

Column 9, Claim 1, line 38, before "plastic" delete "slot" and insert --outer--; delete "slit" and insert --slot--.

UNITED STATES PATENT AND TRADEMARK OFFICE
CERTIFICATE OF CORRECTION

PATENT NO. : 4,986,575

DATED : January 22, 1991

INVENTOR(S) : Braun

It is certified that error appears in the above-identified patent and that said Letters Patent is hereby corrected as shown below:

Column 8, line 16, delete "the, inner tube" and insert --the inner tube--.

Column 9, Claim 1, line 38, before "plastic" delete "slot" and insert --outer--; delete "slit" and insert --slot--.

Signed and Sealed this

Tenth Day of November, 1992

*Attest:*

DOUGLAS B. COMER

*Attesting Officer*     *Acting Commissioner of Patents and Trademarks*